US012615218B2

(12) United States Patent
Peng et al.

(10) Patent No.:  US 12,615,218 B2
(45) Date of Patent:      Apr. 28, 2026

(54) MESSAGE SCHEDULING METHOD, NETWORK DEVICE, STORAGE MEDIUM, AND COMPUTER PROGRAM PRODUCT

(71) Applicant: ZTE CORPORATION, Shenzhen (CN)

(72) Inventors: Shaofu Peng, Shenzhen (CN); Bin Tan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 49 days.

(21) Appl. No.: 18/725,930

(22) PCT Filed: Aug. 30, 2022

(86) PCT No.: PCT/CN2022/115917
§ 371 (c)(1),
(2) Date: Jul. 1, 2024

(87) PCT Pub. No.: WO2023/130744
PCT Pub. Date: Jul. 13, 2023

(65) Prior Publication Data
US 2025/0133033 A1      Apr. 24, 2025

(30) Foreign Application Priority Data
Jan. 4, 2022     (CN) .......................... 202210005978.1

(51) Int. Cl.
*H04L 47/56*            (2022.01)
*H04L 47/283*           (2022.01)
(52) U.S. Cl.
CPC .......... *H04L 47/564* (2013.01); *H04L 47/283* (2013.01)
(58) Field of Classification Search
CPC ............. H04L 43/0852; H04L 43/0829; H04L 65/1069; H04L 45/28; H04L 43/16;
(Continued)

(56) References Cited

U.S. PATENT DOCUMENTS

| 8,125,907 B2 * | 2/2012 | Averi .................... H04L 45/125 |
| | | 455/452.2 |
| 2008/0219267 A1 * | 9/2008 | Xia ......................... H04L 47/28 |
| | | 370/412 |

(Continued)

FOREIGN PATENT DOCUMENTS

| CN | 108270674 A | 7/2018 |
| CN | 110166380 A | 8/2019 |

(Continued)

OTHER PUBLICATIONS

International Searching Authority. International Search Report and Written Opinion for PCT Application No. PCT/CN2022/115917 and English translation, mailed Nov. 16, 2022, pp. 1-9.

(Continued)

*Primary Examiner* — Djenane M Bayard
(74) *Attorney, Agent, or Firm* — Vivacqua Crane, PLLC

(57) ABSTRACT

A method for packet scheduling, a network device, a storage medium, and a computer program product are disclosed. The method may include acquiring a local deadline time indicative of a maximum allowable residence time of a packet at a local node; acquiring a cumulative deadline time indicative of a sum of each local deadline time that the packet goes through at each upstream node via which the packet is transferred, and a cumulative residence time indicative of the sum of each local residence time that the packet goes through at each upstream node via which the packet is transferred; and calculating a deadline time adjustment value according to the local deadline time, the cumulative deadline time, and the cumulative residence time; and adjusting a time at which the packet is sent according to the deadline time adjustment value.

17 Claims, 5 Drawing Sheets

(58) Field of Classification Search
CPC ... H04L 43/087; H04L 65/80; H04L 41/5003; H04L 45/22; H04L 47/10; H04L 45/304; H04L 12/66; H04L 47/32; H04L 41/5009; H04L 41/0631; H04L 41/22; H04L 43/50; H04L 47/12; H04L 47/805; H04L 65/1104; H04L 43/04; H04L 43/0847; H04L 41/0213; H04L 47/125; H04L 43/0876; H04L 47/2416; H04L 12/14; H04L 41/0681; H04L 41/0896; H04L 43/0894; H04L 45/00; H04L 45/3065; H04L 63/08; H04L 63/102; H04L 69/16; H04L 12/5692; H04L 12/6418; H04L 41/0677; H04L 43/062; H04L 43/0882; H04L 45/123; H04L 47/122; H04L 47/22; H04L 67/14; H04L 67/141; H04L 67/146; H04L 43/08; H04L 41/5051; H04L 41/509; H04L 43/045; H04L 47/11; H04L 12/1403; H04L 41/0668; H04L 41/0816; H04L 41/0823; H04L 41/142; H04L 41/5087; H04L 43/10
See application file for complete search history.

(56) References Cited

U.S. PATENT DOCUMENTS

| | | | | |
|---|---|---|---|---|
| 2021/0297362 | A1* | 9/2021 | Eckert | H04L 47/32 |
| 2022/0337507 | A1* | 10/2022 | Davey | H04L 45/023 |

FOREIGN PATENT DOCUMENTS

| | | |
|---|---|---|
| CN | 110266422 A | 9/2019 |
| WO | 2020191014 A1 | 9/2020 |
| WO | 2021101610 A1 | 5/2021 |

OTHER PUBLICATIONS

European Patent Office. Extended European Search Report for EP Application No. 22918199.5, mailed Feb. 14, 2025, pp. 1-17.

* cited by examiner 110          120          130

| Deadline Queue Group | |
|---|---|
| queue 1 | TTL: 60 µs |
| queue 2 | TTL: 59 µs |
| queue 3 | TTL: 58 µs |
| · · · · · · | |
| queue 60 | TTL: 1 µs |
| queue 61 | TTL: 0 µs |
| · · · · · · | |

| Non-Deadline Queue Group | |
|---|---|
| queue 62 | |
| queue 63 | |
| · · · · · · | |

| Deadline Queue Group | |
|---|---|
| queue 1 | TTL: 59 µs |
| queue 2 | TTL: 58 µs |
| queue 3 | TTL: 57 µs |
| · · · · · · | |
| queue 60 | TTL: 0 µs |
| queue 61 | TTL: 60 µs |
| · · · · · · | |

| Non-Deadline Queue Group | |
|---|---|
| queue 62 | |
| queue 63 | |
| · · · · · · | |

· · · · · ·

T0          T0+1 µs          T0+2 µs

| Determine a target forwarding queue from the plurality of forwarding queues according to the deadline time adjustment value | S141 |

| Cache the packet in the target forwarding queue to adjust the time at which the packet is sent | S142 |

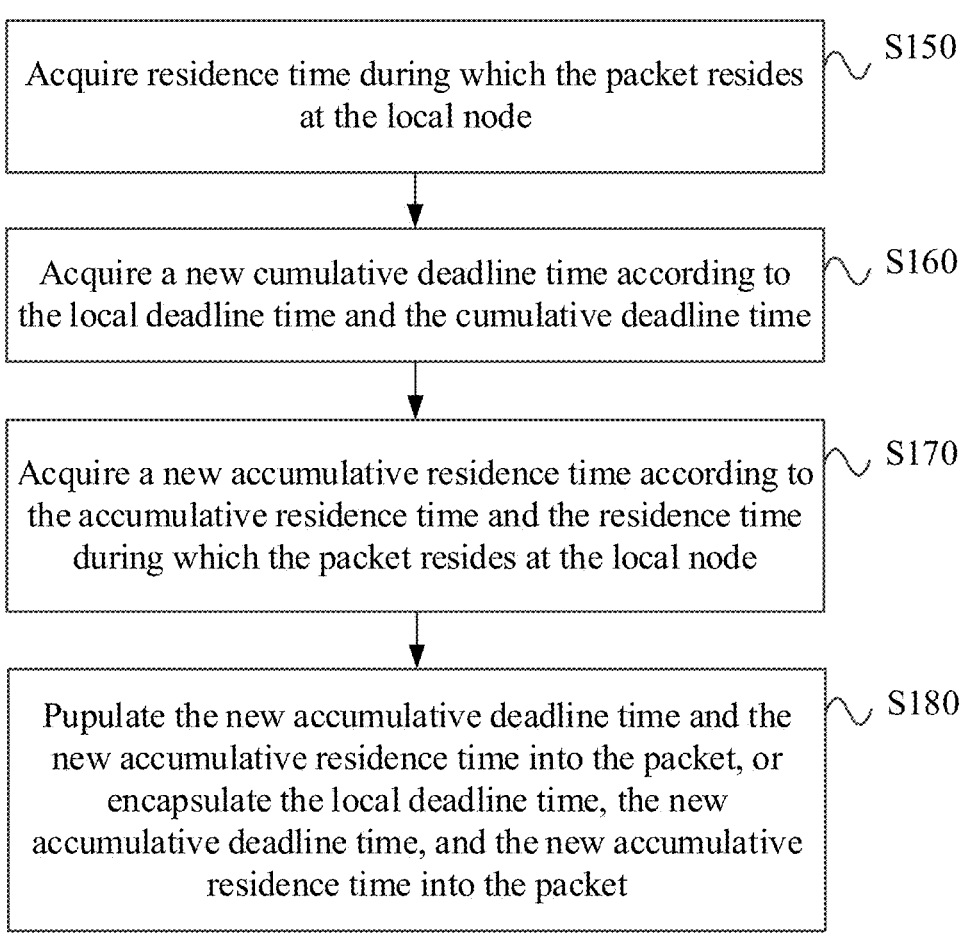

Acquire residence time during which the packet resides at the local node ~ S150

Acquire a new cumulative deadline time according to the local deadline time and the cumulative deadline time ~ S160

Acquire a new accumulative residence time according to the accumulative residence time and the residence time during which the packet resides at the local node ~ S170

Pupulate the new accumulative deadline time and the new accumulative residence time into the packet, or encapsulate the local deadline time, the new accumulative deadline time, and the new accumulative residence time into the packet ~ S180

FIG. 7

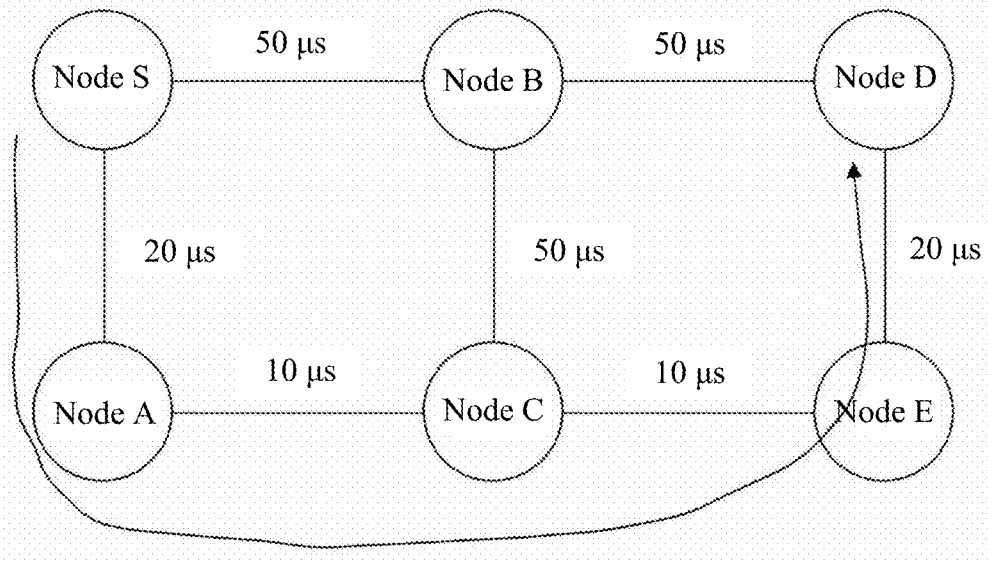

FIG. 8

MESSAGE SCHEDULING METHOD, NETWORK DEVICE, STORAGE MEDIUM, AND COMPUTER PROGRAM PRODUCT

CROSS-REFERENCE TO RELATED APPLICATION

This application is a national stage filing under 35 U.S.C. § 371 of international application number PCT/CN2022/115917, filed Aug. 30, 2022, which claims priority to Chinese patent application No. 202210005978.1 filed Jan. 4, 2022. The contents of these applications are incorporated herein by reference in their entirety.

TECHNICAL FIELD

The present disclosure relates to but is not limited to the field of networks, and in particular to a method for packet scheduling, a network device, a storage medium, and a computer program product.

BACKGROUND

In RFC8655, the architecture of deterministic networks is described, in which the Quality of Service (QOS) objectives of deterministic forwarding are defined. The objectives include the minimum and maximum latency from the source node to the destination node, bounded latency jitter, allowable packet loss rate, and the upper bound of out-of-order packet delivery. In order to achieve these QoS goals, a deterministic path is typically calculated before a packet is transmitted. The deterministic path is a strict explicit path calculated by a centralized controller. Resource reservation is performed at the nodes along the path, so as to meet the Service Level Agreement (SLA) requirements of deterministic services.

In some cases, the controller limits the local deadline time of each node in the deterministic path and requires each node to send the packet when its local deadline time is reached. However, some nodes would have latency in packet transmission for various reasons. The latency would lead to a large latency jitter when the packet arrives at the destination node, such that the service demands with stricter jitter requirements are not met.

SUMMARY

The following is a summary of the subject matter described herein. This summary is not intended to limit the scope of protection of the claims.

Provided are a method for packet scheduling, a network device, a storage medium, and a computer program product in some embodiments of the present disclosure.

According to an embodiment, a method for packet scheduling is provided. The method may include: acquiring a local deadline time indicative of a maximum allowable residence time of a packet in a local node; and acquiring a cumulative deadline time indicative of a sum of each local deadline time that the packet goes through at each upstream node via which the packet is transferred, and a cumulative residence time indicative of the sum of each local residence time that the packet goes through at each upstream node via which the packet is transferred; and calculating a deadline time adjustment value according to the local deadline time, the cumulative deadline time, and the cumulative residence time; and adjusting a time at which the packet is sent according to the deadline time adjustment value.

According to an embodiment, a method for packet scheduling is provided. The method may include: acquiring a local deadline time indicative of a maximum allowable residence time of a packet in a local node; and acquiring a cumulative latency error indicative of a difference between a sum of each local deadline time that the packet goes through at each upstream node via which the packet is transferred and the sum of each residence time that the packet goes through at each upstream node via which the packet is transferred; calculating a deadline time adjustment value according to the local deadline time, and the cumulative latency error; and adjusting a time at which the packet is sent according to the deadline time adjustment value.

According to an embodiment of the present disclosure, a network device is provided. The device may include a memory, a processor, and a computer program stored in the memory and executable on the processor which, when executed by the processor, causes the processor to carry out the any one of the methods as described above.

According to an embodiment of the present disclosure, a computer-readable storage medium is provided. The medium stores a computer-executable instruction which, when executed by a processor causes the processor to carry out any one of the methods as described above.

According to an embodiment of the present disclosure, a computer program product is provided. The product may include a computer program, or a computer instruction stored in a computer-readable storage medium which, when executed by a processor of a computer device, causes the computer device to carry out any one of the methods as described above.

Other features and advantages of the present disclosure will be illustrated in the following description, and in part will be apparent from the description, or may be understood by practicing the present disclosure. The objects and other advantages of the present disclosure can be achieved and obtained by the structure particularly set forth in the description, claims and drawings.

BRIEF DESCRIPTION OF DRAWINGS

The drawings are intended to provide a further understanding of the technical scheme of the present disclosure, and constitute a part of the specification, and they are intended to illustrate the technical scheme of the present disclosure in conjunction with the embodiments of the present disclosure, but are not intended to limit the technical scheme of the present disclosure.

FIG. 7 depicts a flowchart showing a method for packet scheduling according to another embodiment of the present disclosure;

FIG. 8 depicts a schematic diagram showing a network topology in which a method for packet scheduling according to an embodiment of the present disclosure is carried out;

DETAILED DESCRIPTION

The purpose, technical scheme and advantages of the present disclosure will become apparent through the following description for various embodiments in conjunction with the drawings. It should be understood that the embodiments described here are intended for illustration but not limitation to the present disclosure.

It shall be noted that, in some cases, the operations shown or described may be performed in a different order than the logical order shown in the flowcharts. It should be noted that the terms "first" and "second", if used in the description, the claims and the drawings are intended to distinguish similar objects, and do not necessarily imply any specific order or sequence.

Provided are a method for packet scheduling, a network device, a storage medium, and a computer program product in some embodiments of the present disclosure. The LDT, CDT, and CRT are obtained first. The LDT is indicative of the maximum allowable residence time of a packet in a local node. The CDT is indicative of a sum of each local deadline time that the packet goes through at each upstream node via which the packet is transferred. The CRT is indicative of the sum of each local residence time that the packet goes through at each upstream node via which the packet is transferred. Then the deadline time adjustment value is calculated according to the LDT, CDT, and CRT. And then the time at which the packet is sent is adjusted according to the deadline time adjustment value. Therefore, according to an embodiment, the packet is not subjected to the limitation for transmission only when the LDT is reached. Instead, the time at which the packet is sent is adjusted according to the deadline time adjustment value calculated by LDT, CDT, and CRT. Therefore, even if the latency jitter occurs due to the latency or temporal advance in sending the packet in some upstream nodes, the local nodes can adjust the time at which the packet is sent through the deadline time adjustment value to reduce the latency jitter. Thereby, the service requirements with stricter jitter requirements are met.

Some embodiments of the present disclosure will be further illustrated with reference to the drawings.

Figure 1:
FIG. 1 depicts a schematic diagram showing a network topology in which a method for packet scheduling according to an embodiment of the present disclosure is carried out.

FIG. 1 depicts a schematic diagram showing a network topology in which a method for packet scheduling according to an embodiment of the present disclosure is carried out. As shown in FIG. 1, the network topology includes a first node 110, a second node 120, and a third node 130. A deterministic latency path passing through the second node 120 can be established between the first node 110 and the third node 130. Each of the first node 110, the second node 120, and the third node 130 can be network equipment such as a router or a switch, and can forward packets.

In this network topology, any node can first obtain the local deadline time, cumulative deadline time, and cumulative residence time, then calculate the deadline time adjustment value according to the local deadline time, cumulative deadline time, and cumulative residence time, and then adjust the time at which the packet is to be sent according to the deadline time adjustment value. The local deadline time is indicative of the maximum allowable residence time of the packet in the local node. The cumulative deadline time is indicative of the sum of local deadline times of all upstream nodes via which the packet is transferred. The cumulative residence time is indicative of the sum of all the local residence times at all upstream nodes via which the packet is transferred.

In addition, in this network topology, any node maintains at least one forwarding queue (or Deadline queue) with a countdown (or remaining time) for some specific egress ports. The number of the Deadline queues can be set appropriately according to the practical application situations. The Deadline queue has the following features.

(1) The countdown of each Deadline queue will decrease over time. When the countdown decreases to 0, the scheduling priority of the corresponding Deadline queue will be set to the highest, such that, the packet(s) in the Deadline queue can get the opportunity to be scheduled immediately, and new packets are not allowed to be buffered. The buffered packets in the Deadline queue in discussion will be sent out from the egress port immediately. The maximum duration allowed for the transmission of the packets in the Deadline queue is the preset grant transmission time. The transmission of all the packets buffered in the Deadline queue will be completed within the grant transmission time. If the transmission of all the packets buffered in the Deadline queue is completed but the grant transmission time is not run out, the packets in other queues with the second highest priority can be scheduled subsequently for transmission within the remaining grant transmission time.

(2) A cyclic timer can be set in the node to decrement the countdown of all Deadline queues, that is, whenever the cyclic timer expires, the countdown interval of all Deadline queues will be subtracted by the cyclic interval of the cyclic timer. For example, if the cyclic interval of the cyclic timer is 1 μs, then every time the cycle timer expires, the countdown of all Deadline queues will be subtracted by 1 μs.

(3) For the Deadline queue whose countdown has decreased to 0, after expiration of the cyclic timer (i.e., the cyclic interval of the cyclic timer runs out) for a new cycle, the countdown of the Deadline queue will be reset to the preset initial value, and new packets are allowed to be buffered in the Deadline queue again, such that the countdown of the time of the Deadline queue will begin in the new cycle.

(4) Packets are allowed to be buffered in a Deadline queue whose countdown does not decrease to 0. For example, when receiving or generating a packet to be forwarded from a specific egress port, a node can first obtain the local deadline time, cumulative deadline time, and cumulative residence time of the packet. The local deadline time is indicative of the maximum allowable residence time of the packet in the local node. The cumulative deadline time is indicative of the sum of local deadline times of all upstream nodes via which the packet is transferred. The cumulative residence time is indicative of the sum of all the local residence times at all upstream nodes via which the packet is transferred. Then, the deadline adjustment value is calculated according to the local Deadline time, cumulative deadline time, and cumulative residence time. Then, the packet is buffered in the Deadline queue whose current countdown is the deadline time adjustment value (or called the allowed queuing latency value), for subsequent transmission.

(5) The scheduling priority of a Deadline queue whose countdown does not decrease to 0 will not be set to the highest, but set to for example, a medium priority or the lowest priority. At this point, the node can configure corresponding strategies to control the transmission of packets buffered in the Deadline queue, such as:

1. It is allowed to participate in queue scheduling (or called early sending strategy, which is suitable for services requiring low latency);
2. It is not allowed to participate in queue scheduling (or sending upon arrival strategy, which is suitable for service requiring low latency jitter).

(6) At the beginning, the initial values of the initial countdown of each queue among all the Deadline queues are diverse, that is to say, only one Deadline queue will decrease to 0 at each time.

Figure 2:
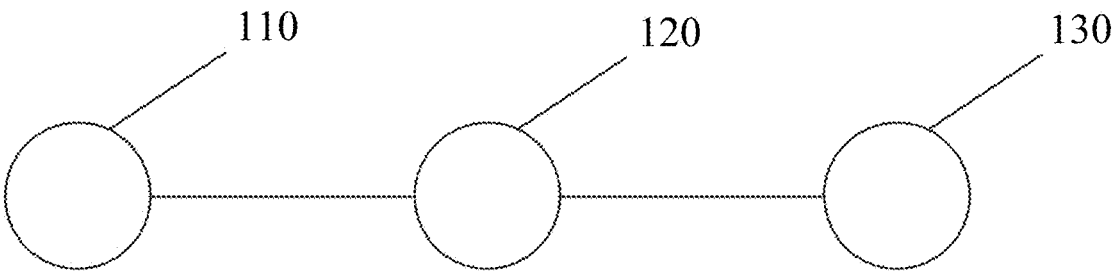
FIG. 2 depicts a schematic diagram showing a Deadline queue according to an embodiment of the present disclosure.

FIG. 2 depicts a schematic diagram showing the Deadline queues according to an embodiment of the present disclosure. In FIG. 2, the Deadline queues include queue 1 to queue 61, while other queues are legacy non-Deadline queues. Each Deadline queue has its countdown attribute, and the default maximum countdown is 60 μs. Referring to FIG. 2, at the initial time (i.e., moment TO), the initial countdowns of all Deadline queues are diverse, for example, the initial countdown of queue 1, queue 2, and queue 3 are 60 μs, 59 μs, and 58 μs, respectively, and so on. At this point, only the initial countdown of queue 61 is 0, that is, queue 61 has the highest scheduling priority at this point.

A cyclic timer with a cyclic interval of 1 us for example, is set in the node. The cyclic interval of the cyclic timer is subtracted from the current countdown of each Deadline queue every time when the cyclic timer expires. As shown in FIG. 2, at moment T0+1 μs, the current countdown of queue 1, queue 2, and queue 3 are 59 μs, 58 μs, and 57 us respectively, and so on. At this point, the current countdown of queue 61 is reset to the maximum countdown (i.e, 60 μs), and the scheduling priority of queue 61 is no longer the highest level, while the current countdown of queue60 becomes 0, so queue 60 has the highest scheduling priority.

It should be noted that the grant transmission time can be less than or equal to the cyclic interval of the cyclic timer. In an example, the grant transmission time is equal to the cyclic interval of the cyclic timer. The packets buffered in the Deadline queue are granted a time limit of 1 us for transmission from the moment when the current countdown of the queue becomes 0. During this period, new packets are prevented from being buffered in the Deadline queue. Upon the lapse of the granted time limit of 1 μs, the cyclic timer expires again. At this point, the current countdown of a further Deadline queue becomes 0, and the buffered packets in the further Deadline queue are sent within 1 μs.

The network topology and application scenarios described in an embodiment of the present disclosure are intended for better understanding of rather than limitations to the technical scheme of various embodiments of the present disclosure. It is known to those having ordinary skills in the art that, with the evolution of the network topology and the emergence of new application scenarios, the technical scheme provided by the embodiment of the present disclosure is also applicable to similar technical problems.

It can be understood by those having ordinary skills in the art that the topology shown in FIG. 1 does not constitute a limitation to the embodiment of the present disclosure, and may include more or less components than those shown, or some components may be combined, or have different component arrangements.

Several embodiments of the present disclosure are proposed based on the above network topology.

Figures 3, 4:
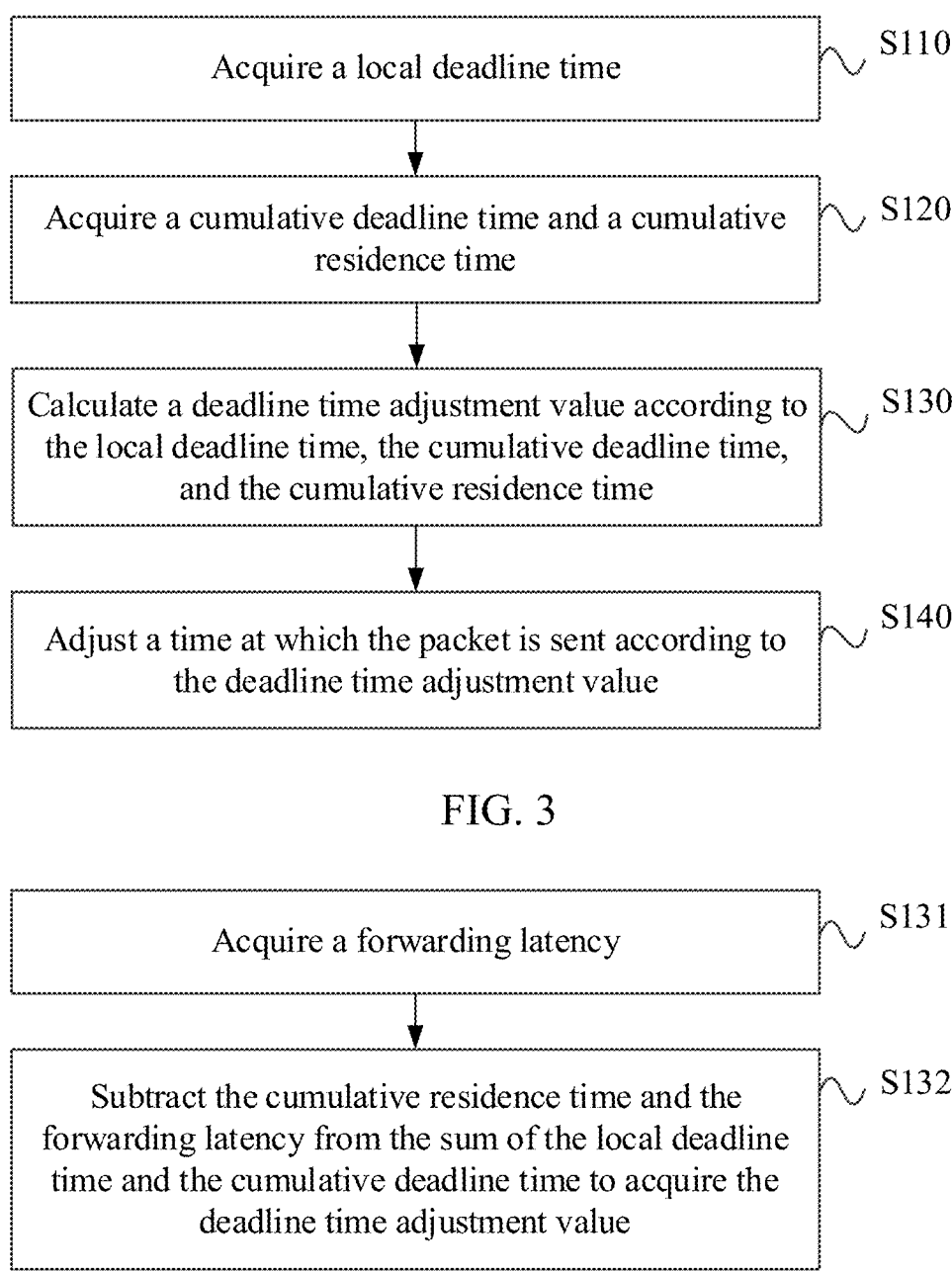
FIG. 3 depicts a flowchart showing a method for packet scheduling according to an embodiment of the present disclosure.
FIG. 4 depicts a flowchart showing an implementation of operation S130 illustrated in FIG. 3.

FIG. 3 depicts a flowchart showing a method for packet scheduling according to an embodiment of the present disclosure. The method can be applied to a node in a network, e.g., the first node 110, or the second node 120 as shown in the network topology in FIG. 1. The method includes without limitation, operations S110, S120, S130, and S140.

At operation S110, a local deadline time is acquired.

It should be noted that the local deadline time (LDT) is a relative time, which is indicative of the maximum allowable residence time of a packet in a local node.

It should be noted that when the local node is the first node of the packet in a transmission path, the local deadline time can be included in the local routing table entry or the local policy table entry. Hence, the local deadline time can be obtained from the local routing table entry or the local policy table entry. When the local node is an intermediate node of the transmission path along which the packet is transferred, the local deadline time can be carried in the packet, or contained in the local routing table entry, or contained in the local policy table entry. As such, the local deadline time can be obtained from the received packet, or from the local routing table entry, or from the local policy table entry.

In an embodiment, when the local deadline time is carried in the packet, the first node in the transmission path can explicitly insert the local deadline time into the encapsulated packet according to the service SLA demand when encapsulating the deterministic service flow. When an intermediate node along the transmission path receives the packet, the intermediate node can directly obtain the local deadline time from the packet. In some embodiments, the packet can carry a single local deadline time applicable to all nodes along the transmission path. That is, all nodes along the transmission path can take the single local deadline time carried in the packet as their local deadline time. In some other embodiments, the packet can carry a stack consisting of multiple local deadline times each corresponding to each node along the transmission path. For example, if the packet transmission path includes three nodes, including a first node, an intermediate node, and a destination node, the packet sent by the first node can carry a stack consisting of two local deadline times, where the first local deadline time corresponds to the intermediate node, and the second local deadline time corresponds to the destination node. When the intermediate node receives the packet, the intermediate node can take the first local deadline time in the packet as its local deadline time. When the destination node receives the packet, the destination node can take the second local deadline time in the packet as its local deadline time.

It should be noted that in this embodiment, it is not intended to specify a particular field for carrying the local deadline time. Also, it is possible to create a new field in the packet to carry the local deadline time. An appropriate field can be selected, or a new field can be created to carry the local deadline time, depending upon the practical application situations. For example, the local deadline time can be carried in the Hop-by-Hop extension header of an IPv6 packet, or in the Source Address field of an IPv6 packet, or in other fields of other types of packets.

In an embodiment, when the local deadline time is contained in the local routing table entry, each node along the packet transmission path will maintain the local routing table entry (for example, a deterministic routing table entry), and after receiving the packet and hitting the local routing table entry, the local deadline time can be obtained from the forwarding information included in the local routing table entry.

In an embodiment, when the local deadline time is included in the local policy table entry, each node along the packet transmission path will be configured with the local policy table entry, and after receiving the packet, the corresponding local deadline time can be matched from the local policy table entry according to the feature information of the packet.

At operation S120, a cumulative deadline time and a cumulative residence time are acquired.

It shall be noted that, the cumulative deadline time (CDT) is indicative of the sum of each local deadline time that the packet goes through at each upstream node via which the packet is transferred. The cumulative residence time (CRT) is indicative of the sum of each local residence time that the packet goes through at each upstream node via which the packet is transferred. The residence time at each upstream node is a relative time. The residence time can be calculated according to the difference between the moment at which the packet is sent and the moment at which the packet is received or generated.

In an embodiment, the CDT and CRT are carried in the packet. Thus, when the local node is the first node along the packet transmission path, both the CDT and CRT are zero (0) since the packet does not carry them. When the local node is an intermediate node along the packet transmission path, both the CDT and CRT can be directly extracted from the packet since they are carried within the packet.

In an embodiment, the packet can include a field for carrying the CDT and a field for carrying the CRT. Thus, when the packet is transferred via a node, the corresponding node accumulates its corresponding LDT into the CDT field in the packet, and accumulates the actual residence time of the packet at the local node into the CRT field in the packet. As such, a downstream node can adjust the time at which the packet is sent according to the CDT and CRT carried in the packet. Thereby, the reduction in latency jitter is achieved.

It should be noted that in this embodiment, it is not intended to specify a particular field for carrying the cumulative deadline time and the cumulative residence time. Also, it is possible to create a new field in the packet to carry the cumulative deadline time and the cumulative residence time. An appropriate field can be selected, or a new field can be created to carry the cumulative deadline time and the cumulative residence time, depending upon the practical application situations. For example, the CDT and the CRT can be carried in the Hop-by-Hop extension header of an IPv6 packet, or in the Source Address field of an IPv6 packet, or in other fields of other types of packets.

It is worth noting that in some cases, there are schemes involving carrying the receiving time and sending time in the packet. For example, after receiving the packet, a certain node A will carry the receiving time when it receives the packet and the sending time when it sends the packet to the outside. After receiving the packet, node B can calculate the residence time of the packet at node A according to the receiving time and sending time carried in the packet. However, this scheme consumes too many bytes in the packet, and it is only suitable for specific packet types (such as specific detection packets) to facilitate chip processing. In addition, this scheme generally requires strict time synchronization between nodes. Therefore, in some cases, this scheme has the problem of low resource utilization. In contrast, in this embodiment, the packet directly carries the CRT indicative of the sum of the residence times that the packet goes through at all upstream nodes. When receiving the packet, a node can directly obtain the cumulative residence time carried in the packet, such that the time at which the packet is sent can be adjusted according to the cumulative residence time in the subsequent operations. In this embodiment the CRT is directly carried in the packet, it is not necessary to carry the receiving time and sending time, thus excessive overhead is not necessary for the packet. This scheme can also be adapted to various types of packets (not subjected to limitation of the standard to the packet) to improve the utilization rate of resources. In addition, since the CRT is a relative time, it is not necessary to achieve strict time synchronization between nodes, which can reduce the complexity of implementation.

In an example, node A records the moment T1 when it receives a packet and the moment T2 when it sends the packet, so the resident time of the packet in node A can be obtained by subtracting T1 from T2. Then, node A accumulates the residence time into the "CRT" field in the packet and sends the packet to another node B. Node B can directly obtain the sum of the residence times of the packet in all upstream nodes including Node A according to the "CRT" field in the packet. When Node B sends the packet to Node C, Node B first calculates the residence time of the packet in Node B according to the same method, and accumulates the residence time in the "CRT" field of the packet, and then sends the packet to Node C.

At operation S130, a deadline time adjustment value is calculated according to the local deadline time, the cumulative deadline time, and the cumulative residence time.

In this operation, the deadline time adjustment value can be calculated according to the LDT acquired in previous operation S110, the CDT, and the CRT acquired in previous operation S120. As such, the time at which the packet is sent can be adjusted according to the deadline time adjustment value in subsequent operations. Thereby, the reduction in latency jitter can be achieved.

It shall be noted that, the LDT is indicative of the maximum allowable residence time of a packet in a local node. The CDT is indicative of a sum of each local deadline time that the packet goes through at each upstream node via which the packet is transferred. The CRT is indicative of the sum of each local residence time that the packet goes through at each upstream node via which the packet is transferred. Hence, based on the CDT and the CRT, the cumulative latency error of the packet can be calculated. The cumulative latency error can be positive or negative. A positive cumulative latency error indicates that the upstream node sends the packet ahead of schedule. A negative cumulative latency error indicates a latency in transmission in the upstream node. Then, the deadline time adjustment value can be calculated according to the cumulative latency error and the LDT. The deadline time adjustment value is a relative time and is indicative of the actual allowable residence time of the packet in the local node with the requirement of latency jitter satisfied. Therefore, when the time at which the packet is sent is adjusted according to the deadline time adjustment value in the subsequent operations, the latency jitter can be reduced, so that the service requirements with stricter jitter requirements can be met.

At operation S140, the time at which the packet is sent is adjusted according to the deadline time adjustment value.

In this operation, the time at which the packet is sent can be adjusted according to the deadline time adjustment value calculated in previous operation S130, so that the latency jitter can be reduced, and further the service requirements with stricter jitter requirements can be met.

In this embodiment, the method for packet scheduling is provided. According to the operations S110, S120, S130, and S140 illustrated above, the LDT, CDT, and CRT are obtained first. The LDT is indicative of the maximum allowable residence time of a packet in a local node. The CDT is indicative of a sum of each local deadline time that the packet goes through at each upstream node via which the packet is transferred. The CRT is indicative of the sum of each local residence time that the packet goes through at each upstream node via which the packet is transferred. Then the deadline time adjustment value is calculated according to the LDT, CDT, and CRT. And then the time at which the packet is sent is adjusted according to the deadline time adjustment value. Therefore, according to this embodiment, the packet is not subjected to the limitation for transmission only when the LDT is reached. Instead, the time at which the packet is sent is adjusted according to the deadline time adjustment value calculated by LDT, CDT, and CRT. Therefore, even if the latency jitter occurs due to the latency or temporal advance in sending the packet in some upstream nodes, the local nodes can adjust the time at which the packet is sent through the deadline time adjustment value to reduce the latency jitter. Thereby, the cumulative effect of end-to-end latency jitter is removed in some cases, thus the service requirements with stricter jitter requirements are met.

As shown in FIG. 4, in an embodiment, S130 may include, but is not limited to, the following operations.

At operation S131, a forwarding latency is acquired.

At operation S132, the cumulative residence time and the forwarding latency are subtracted from the sum of the local deadline time and the cumulative deadline time to acquire the deadline time adjustment value.

It should be noted that when the packet is forwarded along a deterministic path, the forwarding process of the packet in the node mainly includes two parts. The first part is to receive the packet from the ingress port (or generate the packet by the control plane), then query the forwarding table entry, and then deliver the packet to the line card where the corresponding egress port is located according to the query table entry. The second part is to buffer the packet to the forwarding queue corresponding to the egress port for transmission. Therefore, the packet will have the resident time at the node during the two-part process, in which the latency generated by the first part of the process can be called the forwarding latency, and the latency generated by the second part of the process can be called queuing latency (or in queue latency). That is, the resident time of the packet at the node is equal to the sum of forwarding latency and queuing latency, in which the forwarding latency is related to the chip implementation. The value of the forwarding latency is constant. The queuing latency depends upon the forwarding queue. Therefore, in this embodiment, when the deadline time adjustment value is calculated, the forwarding latency is obtained. Then the CRT and forwarding latency can be subtracted from the sum of the LDT and the CDT to obtain the deadline time adjustment value. That is to say, the cumulative latency error of the packet can be obtained by subtracting the CRT from the CDT, and then the cumulative latency error and the LDT can be added to obtain the local latency adjustment value. Then, on the basis of the local latency adjustment value, the deadline time adjustment value is obtained by subtracting the forwarding latency of the packet within the node. It should be noted that the deadline time adjustment value corresponds to the queuing latency. Hence, in the subsequent operations, Deadline queue corresponding to the queuing latency whose value is equal to the deadline time adjustment value can be selected. The packet can be buffered in the Deadline queue for subsequent transmission.

In an example, the node i is a node along a deterministic path. Node 1 to node i−1 are the upstream nodes of node i, and the downstream node is node i+1. The LDT of the node i is D, the resident time of the packet in the node is R, the local latency adjustment value of the node is M, the forwarding latency of the node is P, the cumulative latency error is E, and the deadline time adjustment value is Q. Then the calculation of the deadline time adjustment value of the packet on this node i is as follows.

(1) The cumulative latency error E from node 1 to node i−1 is:

$$E = \sum_{k=1}^{i-1} D_k - \sum_{k=1}^{i-1} R_k; \tag{a}$$

where, Dk denotes the LDT of node k, and Rk denotes the resident time of the packet in node k, so $$\sum_{k=1}^{i-1} D_k$$

denotes the CDT, and $$\sum_{k=1}^{i-1} R_k$$

denotes the CRT. It is worth noting that both $$\sum_{k=1}^{i-1} D_k \text{ and } \sum_{k=1}^{i-1} R_k$$

are carried in the packet.

(2) The local latency adjustment value Mi of node i is:

$$Mi = Di + E; \tag{b}$$

where Di denotes the local deadline time of node i.

(3) The deadline time adjustment value Qi of node i is:

$$Qi = Mi - Pi; \tag{c}$$

where Pi denotes the forwarding latency of the packet in node i.

That is to say, through the above equations (a) to (c), the deadline time adjustment value of the local node can be calculated. As such, in the subsequent operations, the Deadline queue corresponding to the queuing latency whose value is equal to the deadline time adjustment value can be selected, and the packet is buffered in the deadline queue for transmission.

It should be noted that in general, if the node of each hop along the packet transmission path strictly controls the scheduling of the packet according to its local deadline time D, such that the residence time R of the packet at the node is very close to the local deadline time D, then the absolute value of the cumulative latency error E will be very small. In addition, in some cases, node 1 to node i−1 all adopt the early sending strategy to send packets quickly, there is almost no queuing latency for the packets in these nodes. Therefore, the residence time R of packets in nodes mainly depends on the forwarding latency P. Thus, $$\sum_{k=1}^{i-1} R_k$$

is about equal to $$\sum_{k=1}^{i-1} P_k.$$

In such a case, the adjustment value Qi of node i is $$Di + \sum_{k=1}^{i-1} D_k - \sum_{k=1}^{i-1} P_k - Pi.$$

Figure 5:
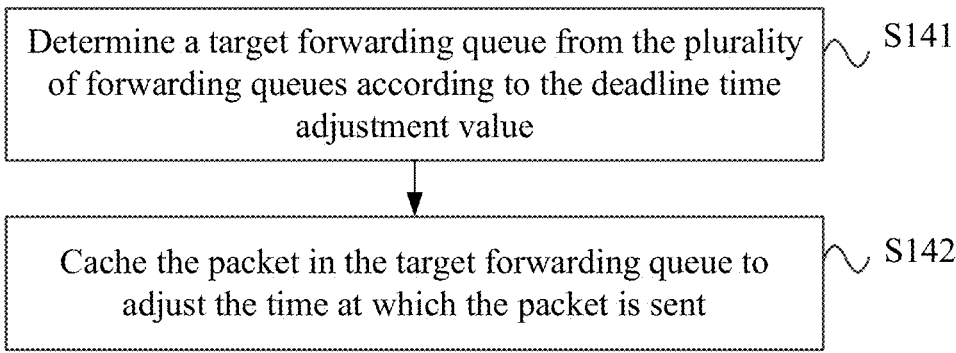
FIG. 5 depicts a flowchart showing an implementation of operation S140 illustrated in FIG. 3.

As shown in FIG. 5, in an embodiment, S140 may include, but is not limited to, the following operations.

At operation S141, a target forwarding queue is determined from the plurality of forwarding queues according to the deadline time adjustment value.

At operation S142, the packet is buffered in the target forwarding queue to adjust the time at which the packet is sent.

It should be noted that the forwarding queue discussed in operation S141 is the Deadline queue in the embodiment(s) illustrated above. Different forwarding queues have different times to send packets (i.e., the moment when the countdown corresponding to the Deadline queue is 0).

In this embodiment, a plurality of forwarding queues (i.e., Deadline queues) can be set in the node. Then, after the deadline time adjustment value is obtained through operation S130, the target forwarding queue can be determined from the plurality of forwarding queues according to the deadline time adjustment value. Then, the packet can be buffered in the target forwarding queue to adjust the time at which the packet is sent. Thereby the latency jitter is reduced, the cumulative effect of end-to-end latency jitter in some cases is removed, and the service requirements with stricter jitter requirements are met.

In addition, in an embodiment of the present disclosure, in the case that different forwarding queues correspond to different current countdown times, and the moment corresponding to the current countdown of 0 is the moment at which the packet is sent, operation S141 may include but not limited to the following operation:

determining the forwarding queue whose current countdown is equal to the deadline time adjustment value from the plurality of forwarding queues as the target forwarding queue.

It should be noted that each of the forwarding queues in this embodiment is the Deadline queue as described in the above embodiments. When the current countdown of the Deadline queue is 0, the Deadline queue will send the buffered packet within the preset grant transmission time. Therefore, the deadline time adjustment value is calculated in operation S130. After that, in order to adjust the time at which the packet is sent according to the deadline time adjustment value, and eliminate the cumulative effect of end-to-end latency jitter in some cases to reduce the latency jitter, the forwarding queue with the current countdown equal to the deadline time adjustment value can be determined as the target forwarding queue. As such, the packet can be buffered in the target forwarding queue in the subsequent operation to adjust the time at which the packet is sent.

In addition, in an embodiment of the present disclosure, in the case that the plurality of forwarding queues correspond to the same maximum countdown, different forwarding queues correspond to different current countdown, and the moment corresponding the current countdown of 0 is the moment at which the packet is sent, operation S141 includes but is not limited to the following operation:

determining the forwarding queue whose current countdown is equal to the maximum countdown as the target forwarding queue, from the plurality of forwarding queues, in response to deadline time adjustment value being greater than the maximum countdown.

It should be noted that when the deadline time adjustment value is greater than the maximum countdown, no forwarding queue is available to buffer the packet for subsequent transmission. The transmission latency and latency jitter of the packet will become larger over time, which leads to a failure in meeting the SLA requirements of deterministic services, and even worse, may lead to the failure in sending the packet, and the service interruption occurs and the normal use of users of the service is affected. In order to avoid these problems, in this embodiment, when the deadline time adjustment value is greater than the maximum countdown, the forwarding queue having the current countdown equal to the maximum countdown will be determined as the target forwarding queue among these forwarding queues. As such, the packet can be buffered in the target forwarding queue for transmission in the subsequent operations. Thereby, the increase in the transmission latency and latency jitter of the packet is avoided, and the service interruption caused by the failure in packet transmission is avoided.

In addition, in an embodiment of the present disclosure, in the case that different forwarding queues correspond to different current countdown times, and the moment corresponding to the current countdown of 0 is the moment at which the packet is sent, operation S141 may include but not limited to the following operation:

The forwarding queue corresponding to the current countdown having the smallest non-zero value is determined as the target forwarding queue among a plurality of forwarding queues, in response to the deadline time adjustment value being less than or equal to 0.

It should be noted that, when the deadline time adjustment value is less than or equal to 0, the forwarding queue corresponding to the current countdown having the smallest non-zero value is determined as the target forwarding queue among a plurality of forwarding queues, specifically, the forwarding queue corresponding to the current countdown closest to the grant transmission time is determined as the target forwarding queue. The grant transmission time is the maximum duration allowed for packet transmission. For the details for the grant transmission time, please refer to the relevant illustrations in the above embodiments, and which will not be repeated here.

It should be noted that if a node operates improperly and does not strictly control the scheduling of the packets according to the local deadline time, which leads to a very large residence time, then the deadline time adjustment value is less than or equal to 0. In this case, the deadline time adjustment value is smaller than the cyclic time interval of the cyclic timer maintained inside the node. In such a case, no forwarding queue is available to buffer the packet for subsequent transmission. The transmission latency and latency jitter of the packet will become larger over time, which leads to a failure in meeting the SLA requirements of deterministic services, and even worse, may lead to the failure in sending the packet, and the service interruption occurs and the normal use of users of the service is affected. In order to avoid these problems, in this embodiment, when the deadline time adjustment value is less than or equal to 0, the forwarding queue having the current countdown closest to the grant transmission time is determined as the target forwarding queue among these forwarding queues. As such, the packet can be buffered in the target forwarding queue for transmission in the subsequent operations. Thereby, the increase in the transmission latency and latency jitter of the packet is avoided, and the service interruption caused by the failure in packet transmission is avoided.

In addition, when the deadline time adjustment value is less than or equal to 0, it indicates that the packet should be sent out as soon as possible. Therefore, the forwarding queue having the current countdown closest to the grant transmission time is determined as the target forwarding queue. As such, the target forwarding queue is enabled to send the packet as soon as possible, thus further increases in the transmission latency and latency jitter are avoided.

In the following, an example is provided to illustrate the determination of the target forwarding queue.

Figure 6:
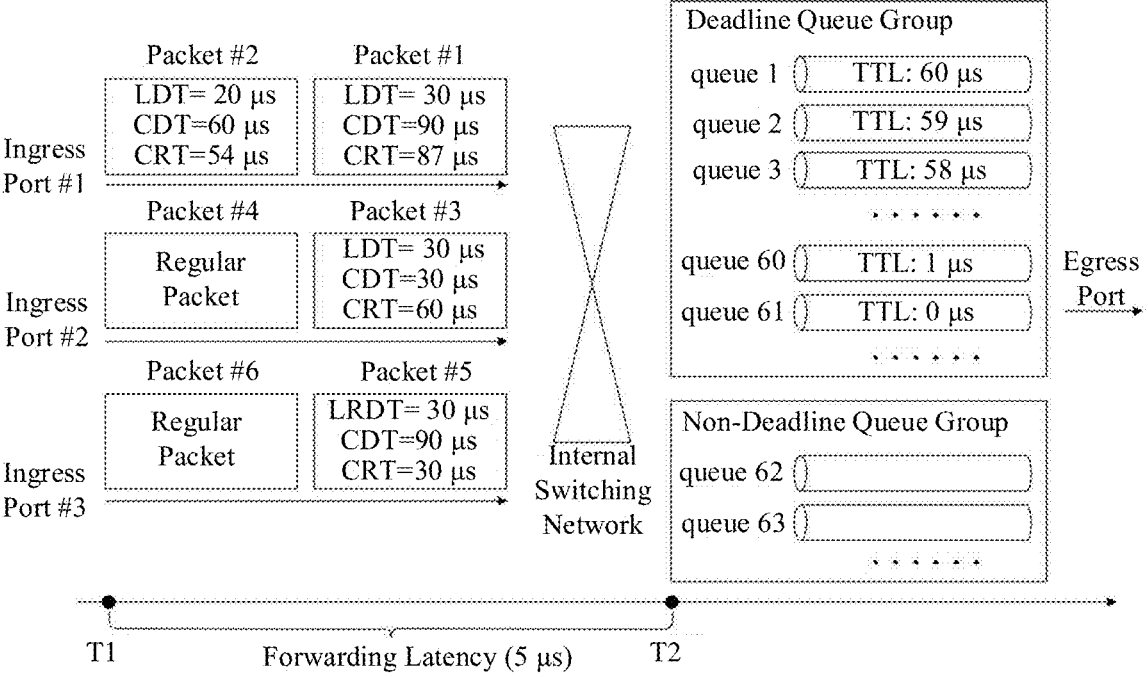
FIG. 6 depicts a schematic diagram showing the determination of a target forwarding queue according to an embodiment of the present disclosure.

FIG. 6 depicts a schematic diagram showing the determination of a target forwarding queue according to an embodiment of the present disclosure. In FIG. 6, the node receives six packets from three ingress ports, in which packet #1, packet #2, packet #3 and packet #5 carry respective LDT, CDT, and CRT, while packet #4 and packet #6 are regular packets. These packets shall be forwarded to the same egress port according to the local forwarding table entry. Assuming that these packets arrive at the line card where the egress port is located at almost the same moment after going through the forwarding latency (for example, 5 µs) in the node, then the queue status of the egress port is as shown in FIG. 6.

The deadline time adjustment value of packet #1 in the node is 30+90−87−5=28 µs, so packet #1 is buffered in queue 33 in the Deadline queue (having a current countdown of 28 µs).

The deadline time adjustment value of packet #2 in the node is 20+60−54−5=21 µs, so packet #2 is buffered in queue 40 in the Deadline queue (having a current countdown of 21 µs).

The deadline time adjustment value of packet #3 in the node is 30+30−60−5=−5 µs, so the deadline time adjustment value will be modified to the cyclic interval of the cyclic timer (e.g., 1 µs). Hence, packet #3 will be buffered in queue 60 in the Deadline queue (having a current countdown of 1 µs), such that packet #3 can be sent as soon as possible.

The deadline time adjustment value of packet #5 in the node is 30+90−30−5=85 µs, so the deadline time adjustment value is modified to the preset maximum countdown (e.g., 60 µs), so packet #5 is buffered in queue 1 in the deadline queue (having a current countdown of 60 µs).

Packets #4 and #6 are buffered in the non-Deadline queue in the legacy way.

As shown in FIG. 7, in an embodiment, the method includes, but is not limited to, the following operations.

At operation S150, a residence time during which the packet resides at the local node is acquired.

At operation S160, a new cumulative deadline time is acquired according to the local deadline time and the cumulative deadline time.

At operation S170, a new cumulative residence time is acquired according to the cumulative residence time and the residence time during which the packet resides at the local node.

At operation S180, the new cumulative deadline time and the new cumulative residence time are filled into the packet, or the local deadline time, the new cumulative deadline time, and the new cumulative residence time are encapsulated into the packet.

In this embodiment, before sending the packet through the target forwarding queue, the residence time of the packet at the local node is obtained first. Then a new cumulative deadline time is obtained according to the local deadline time and the cumulative deadline time. The new cumulative residency time is obtained according to the cumulative residence time and the residence time of the packet at the local node. Then the packet is populated with the new cumulative deadline time and the new cumulative residence time. Alternatively, the local deadline time, the new cumulative deadline time, and the new cumulative residence time are encapsulated into the packet, such that after the packet is transmitted to the subsequent node, the subsequent node can obtain the cumulative deadline time and the cumulative residence time from the packet, or obtain the local deadline time, the cumulative deadline time and the cumulative residence time from the packet. Thereby, the subsequent node can calculate the deadline time adjustment value according to the information. Hence, the time at which the packet is sent can be adjusted according to the deadline time adjustment value, the latency jitter is reduced, and the cumulative effect of end-to-end latency jitter in some cases is eliminated. As a result, the service requirements with stricter jitter requirements are met.

It should be noted that if each node along the packet transmission path stores the local deadline time in its maintained local routing table entry or local policy table entry, then the local node can populate the packet with the new cumulative deadline time and new cumulative residence time. Conversely, if each node along the packet transmission path does not store the local deadline time in its maintained local routing table entry or local policy table entry, then it is necessary to encapsulate the local deadline time, the new cumulative deadline time, and the new cumulative residence time into the packet.

According to an embodiment, another method for packet scheduling is provided. This method is different from the method for packet scheduling discussed previously in the above embodiment(s) in that: in this embodiment, the local deadline time and the cumulative latency errors are obtained, and then the deadline time adjustment value is calculated according to the local deadline time and the cumulative latency error to adjust the time at which the packet is sent. In the above embodiment(s), the local deadline time, cumulative deadline time, and cumulative residence time are obtained, and then the deadline time adjustment value is calculated according to the local deadline time, cumulative deadline time, and cumulative residence time to adjust the time at which the packet is sent. The method for packet scheduling in this embodiment includes but is not limited to the following operations:

acquiring a local deadline time indicative of the maximum allowable residence time of a packet in a local node;

acquiring a cumulative latency error indicative of a difference between the sum of each local deadline time that the packet goes through at each upstream node via which the packet is transferred, and the sum of each residence time that the packet goes through at each upstream node via which the packet is transferred;

calculating a deadline time adjustment value according to the local deadline time, and the cumulative latency error; and adjusting a time at which the packet is sent according to the deadline time adjustment value.

In an embodiment, calculating the deadline time adjustment value according to the local deadline time and the cumulative latency error includes, but is not limited to, the following operations:

acquiring a forwarding latency; and subtracting the forwarding latency from a sum of the local deadline time and the cumulative latency error to acquire the deadline time adjustment value.

In an embodiment, adjusting the time at which the packet is sent according to the deadline time adjustment value includes but is not limited to the following operations:

determining a target forwarding queue from a plurality of forwarding queues according to the deadline time adjustment value, where each of the plurality of forwarding queues has a distinct time for packet transmission; and caching the packet to the target forwarding queue to adjust the time at which the packet is sent.

In an embodiment, in the case that different forwarding queues correspond to different current countdown times, and the time corresponding to the current countdown of 0 is the time at which a packet is sent, determining the target forwarding queue from the plurality of forwarding queues according to the deadline time adjustment value includes but is not limited to the following operations:

Determining, among the plurality of forwarding queues, the forwarding queue whose current countdown is equal to the deadline time adjustment value as the target forwarding queue.

In an embodiment, in the case that the plurality of forwarding queues correspond to the same maximum countdown, different forwarding queues correspond to different current countdown times, and the time corresponding to the current countdown of 0 is the time at which a packet is sent, determining the target forwarding queue from the plurality of forwarding queues according to the deadline time adjustment value includes, but is not limited to, the following operations:

determining the forwarding queue whose current countdown is equal to the maximum countdown as the target forwarding queue, from the plurality of forwarding queues, in response to the deadline time adjustment value being greater than the maximum countdown.

In an embodiment, in the case that different forwarding queues correspond to different current countdown times, and the time corresponding to the current countdown of 0 is the time at which the packet is sent, determining the target forwarding queue from the plurality of forwarding queues according to the deadline time adjustment value includes but is not limited to the following operations:

The forwarding queue corresponding to the current countdown having the smallest non-zero value is determined as the target forwarding queue among a plurality of forwarding queues, in response to the deadline time adjustment value being less than or equal to 0.

In an embodiment, the method for packet scheduling further includes:

acquiring the residence time of a packet at a local node;

acquiring a new cumulative latency error according to the cumulative latency error, the local deadline time, and the residence time of the packet in the local node; and populating the packet with the new cumulative latency error, or encapsulating the local deadline time and the new cumulative latency error into the packet.

In an embodiment, in the case that the local node is an intermediate node along the packet transmission path along which the packet is transmitted, acquiring the local deadline time includes but is not limited to the following operations:

acquiring the local deadline time from the packet;

or, acquiring the local deadline time from the local routing table entry;

or, acquiring the local deadline time from a local policy table entry.

In an embodiment, in the case that the local node is an intermediate node along the packet transmission path along which the packet is transmitted, acquiring the cumulative latency error includes but is not limited to the following operations: acquiring the cumulative latency error from the packet.

It should be noted that the cumulative latency error in this embodiment can be obtained by subtracting the cumulative residence time from the cumulative deadline time. In this embodiment, the cumulative latency error can be directly carried within the packet. Hence, when receiving the packet, the intermediate node can directly obtain the cumulative latency error in the packet. In addition, when sending a packet to the subsequent node, the packet can be populated with the cumulative latency error. As such, the subsequent node can also directly obtain the cumulative latency error in the packet. Therefore, the subsequent node can calculate and obtain the deadline time adjustment value according to the cumulative latency error to adjust the time at which the packet is sent.

It should be noted that the method for packet scheduling discussed in this embodiment (i.e., the cumulative latency error is directed carried in the packet) is similar to the method discussed in the above embodiment(s) (i.e., the cumulative deadline time and cumulative residence time are carried in the packet), to share some same aspects except for the above differences. For the specific content and explanation of the same aspects, please refer to the method for packet scheduling discussed in the above embodiment(s) (i.e., the cumulative deadline time and cumulative residence time are carried in the packet), and which will not be repeated here for brevity.

In the following, two example embodiments are provided in order to illustrate the process of the method for packet scheduling in greater detail.

Example Embodiment One

The network topology shown in FIG. 8 includes node S, node A, node B, node C, node D, and node E. A deterministic latency path based on Deadline queue scheduling is established in the network topology. The path can be instantiated as SR policy, SR tunnel, or RSVP-TE tunnel, and the present disclosure is not limited thereto. The path is node S-node A-node C-node E-node D. The deterministic latency of the path is 160 μs, and all nodes along the path adopt the method for packet scheduling according to an embodiment of the present disclosure to provide the deterministic latency target. In the network topology of FIG. 8, the latency parameters of each link excluding the node latency are shown. For example, the minimum latency of the link between node S and node A is 20 μs. Therefore, in the total latency requirement of the whole path (160 μs), in which 60 μs is the accumulated link latency excluding the node latency, and 100 μs is the accumulated latency within the nodes, in which the accumulated latency within the nodes is equally shared by node S, node A, node B, node C, node D, and node E, that is, the local deadline time of the packet in each node is 25 μs.

When node S encapsulates and forwards the packet along the deterministic latency path, the packet can carry a single local deadline time (the numerical value is 25 μs), which is utilized for all nodes along the deterministic latency path to perform the method for packet scheduling according to an embodiment of the present disclosure. Assuming that the forwarding latency of each node is 5 μs and each node adopts the "transmitting upon arrival" strategy, the transmission of the packet along the path is as follows:

At the initial moment TO, the node S encapsulates the packet, then forwards the packet to the line card where the egress port (link-S-A) is located at a cost of 5 μs (i.e., the forwarding latency), and then caches the packet in the Deadline queue with a current countdown of 20 μs (i.e., the local deadline time minus forwarding latency). After 20 μs, the packet is scheduled, assuming that the node S sends the packet from the link-S-A at the end of the grant transmission time of 1 μs, that is, it takes an extra 1 μs to send the packet, and then, after the link transmission latency of 20 μs, the packet arrives at the node A. At this point, the packet is encapsulated with a cumulative deadline time of 25 μs and a cumulative residence time of 26 μs.

At moment T0+46 μs, node A receives the packet, and then forwards the packet to the line card where the egress port (link-A-C) is located at a cost of 5 μs (i.e. forwarding latency), and then caches the packet in the Deadline queue with the current countdown of 19 μs (i.e., 25 μs+25 μs−26 μs−5 μs=19 μs). After 19 μs, the packet is scheduled, assuming that node A sends the packet from the link-A-C at the beginning of the grant transmission time of 1 μs, that is, it does not need to take an extra 1 μs to send the packet, and then, after a link transmission latency of 10 μs, the packet arrives at node C. At this point, the packet is encapsulated with a cumulative deadline time of 50 μs and a cumulative residence time of 50 μs.

At moment T0+80 μs, node C receives the packet, and then forwards the packet to the line card where the egress port (link-C-E) is located at a cost of 5 μs (i.e. forwarding latency), and then caches the packet in the Deadline queue with the current countdown of 20 μs (i.e., 25 μs+50 μs-50 μs-5 μs=20 μs). After 20 μs, the packet is scheduled, assuming that node C sends the packet from the egress port (link-C-E) at the end of the grant transmission time of lus, that is, it takes an extra 1 μs to send the packet, and then, after the link transmission latency of 10 μs, the packet arrives at node E. At this point, the packet is encapsulated with a cumulative deadline time of 75 μs and a cumulative residence time of 76 μs.

At moment T0+116 μs, node E receives the packet, and then forwards the packet to the line card where the egress port (link-E-D) is located at a cost of 5 μs (i.e. forwarding latency), and then caches the packet in the Deadline queue with the current countdown of 19 μs (i.e., 25 μs+70 μs-76 μs-5 μs=19 μs). After 19 μs, the packet is scheduled, assuming that node E sends the packet from the egress port (link-E-D) at the end of the grant transmission time of lus, that is, it takes an extra 1 μs to send the packet, and then, after the link transmission latency of 20 μs, the packet arrives at node D. At this point, the packet is encapsulated with a cumulative deadline time of 100 μs and a cumulative residence time of 101 μs.

At moment T0+161 μs, node D receives the packet.

According to this example embodiment, when a packet is forwarded, each node can dynamically adjust the time at which the packet is sent such that the end-to-end jitter is only the grant transmission time (e.g., the cyclic interval of the cyclic timer, and 1 μs for this example embodiment). As such, excellent jitter elimination ability is exhibited. In contrast, it is worth noting that if the method for packet scheduling method in the existing technology is adopted, the end-to-end jitter will be the number of transmission hops multiplied by the grant transmission time of the forwarding queue. For example, when the packet is sent along the path S-A-C-E-D in this example, the end-to-end jitter will be 4 μs. Therefore, the method for packet scheduling discussed in this example can reduce the latency jitter more effectively, such that the service demands with stricter jitter requirements are met.

Example Embodiment Two

Figure 9:
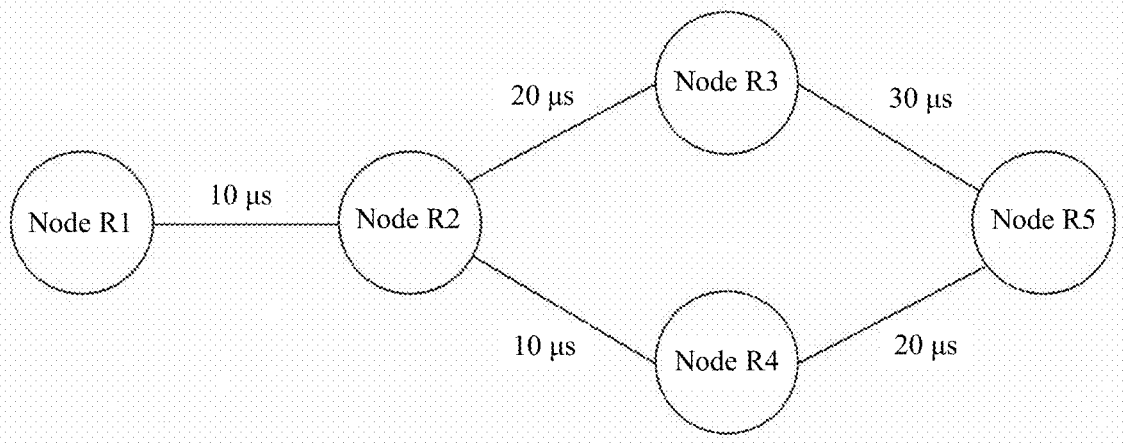
FIG. 9 depicts a schematic diagram showing a network topology in which a method for packet scheduling according to another embodiment of the present disclosure is carried out.

An Interior Gateway Protocol (IGP) network as shown in FIG. 9 includes a node R1, a node R2, a node R3, a node R4, and a node R5. Node R1 is connected with node R2. Node R2 is connected with node R3 and the node R4 respectively. Node R3 and node R4 are connected with node R5 respectively. Each link is a bidirectional link, and each node in the IGP network adopts the method for packet scheduling according to an embodiment of the present disclosure to provide a deterministic latency target. In the IGP network shown in FIG. 9, the latency parameters of each link excluding the node latency are shown. For example, the minimum latency of the link between node R1 and node R2 is 10 μs. In addition, it is assumed that all nodes in the IGP network are configured with consistent packet scheduling parameters, and these nodes have consistent intra-node latency and latency jitter properties, for example, the configured intra-node latency is 30 μs and the intra-node latency jitter is 0.

Assuming that node R5 is the destination node, each node in the IGP network will create a deterministic forwarding table entry to the destination node R5, in which the forwarding information contained in the deterministic forwarding table entry provides a local deadline time of 30 μs for the packet. In addition, because the latency jitter is 0, each node will adopt the queue scheduling strategy of "transmission upon arrival". Compared with the example embodiment one above, in this example, the local deadline time is provided in the routing table entry. Hence, it is not necessary to carry the local deadline time in the packet. The packet only carries the cumulative deadline time and cumulative residence time. As such, the subsequent node can calculate the deadline time adjustment value according to the local deadline time provided in the routing table entry and the cumulative deadline time and cumulative residence time carried within the packet after receiving the packet, so as to adjust the time at which the packet is sent. Thereby, the latency jitter is reduced, and the cumulative effect of end-to-end latency jitter in some cases is eliminated. As a result, the service requirements with stricter jitter requirements are met. In addition, in this example, when each node calculates the deadline time adjustment value to adjust the time at which the packet is sent, the process of calculating the deadline time adjustment value is similar to that of each node in example embodiment one discussed above. Therefore, the process of calculating the deadline time adjustment value of each node in this example can refer to the relevant content description in example embodiment one discussed above, and which is not repeated here for brevity.

Figure 10:
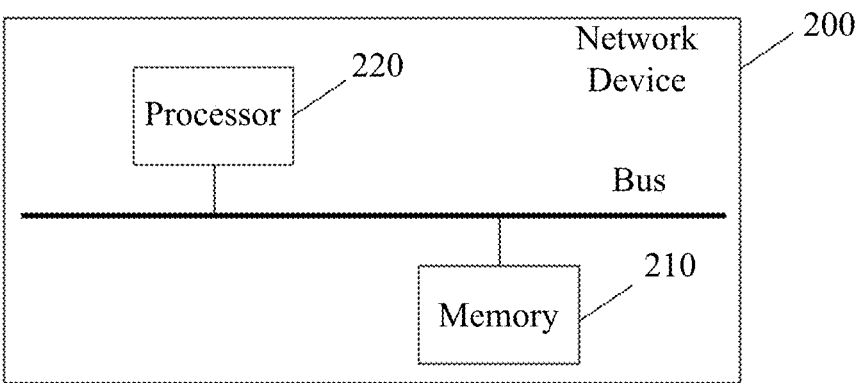
FIG. 10 depicts a schematic diagram showing a network device according to an embodiment of the present disclosure.

Referring to FIG. 10, a network device is provided according to an embodiment. The network device 200 includes a memory 210, a processor 220 and a computer program stored in the memory 210 and executable by the processor 220.

The processor 220 and the memory 210 may be connected by a bus or other means.

As a non-transitory computer-readable storage medium, the memory 210 can be configured to store non-transitory software programs and non-transitory computer-executable programs. In addition, the memory 210 can include high-speed random-access memory and non-transitory memory, such as at least one disk memory device, flash memory device, or other non-transitory solid-state memory devices. In some implementations, the memory 210 may include memories remotely located relative to the processor 220, and these remote memories may be connected to the processor 220 through a network. Examples of the above networks include, but are not limited to, the Internet, intranet, local area network, mobile communication network, and combinations thereof.

It should be noted that the network device 200 in this embodiment can be implemented as the network node in the embodiment shown in FIG. 1. The network device 200 in this embodiment can constitute a part of the network topology of the embodiment shown in FIG. 1, so these embodiments belong to the same invention concept and have the same implementation principles and technical effects, and which will not be described in detail here.

Non-transitory software programs and instructions for the method for packet scheduling in the above embodiments are stored in a memory 210 which, when executed by a processor 220, causes the processor 220 to carry out the method for packet scheduling, e.g., S110 to S140 described in conjunction with FIGS. 3, S131 to S132 described in conjunction with FIGS. 4, S141 to S142 described in conjunction with FIG. 5, or S150 to S180 described in conjunction with FIG. 7.

The above-described embodiments are only schematic, in which the units illustrated as separate components may or may not be physically separated, that is, the device may be located in one place or distributed over several network units. Some or all of the modules can be selected according to the practical needs to achieve the purpose of this embodiment.

In addition, an embodiment of the present disclosure further provides a computer-readable storage medium, which stores computer-executable instructions which, when executed by a processor or controller, for example, by a processor in the embodiment of the device, causes the processor to carry out the method for packet scheduling of the above embodiments, for example, the above-described operations S110 to S140 described in conjunction with FIGS. 3, S131 to S132 described in conjunction with FIGS.

4, S141 to S142 described in conjunction with FIGS. 5, S150 to S180 described in conjunction with FIG. 7.

According to an embodiment of the present disclosure, a computer program product is provided. The computer program product includes a computer program, or a computer instruction stored in a computer-readable storage medium which, when executed by a processor of a computer device, causes the computer device to carry out the method as described above.

According to an embodiment, a method for packet scheduling is provided. The method includes, acquiring the LDT, CDT, and CRT. The LDT is indicative of the maximum allowable residence time of a packet in a local node. The CDT is indicative of a sum of each local deadline time that the packet goes through at each upstream node via which the packet is transferred. The CRT is indicative of the sum of each local residence time that the packet goes through at each upstream node via which the packet is transferred. Therefore, the deadline time adjustment value is calculated according to the LDT, CDT, and CRT. And then the time at which the packet is sent is adjusted according to the deadline time adjustment value. That is, according to an embodiment, the packet is not subjected to the limitation for transmission only when the LDT is reached. Instead, the time at which the packet is sent is adjusted according to the deadline time adjustment value calculated by LDT, CDT, and CRT. Therefore, even if the latency jitter occurs due to the latency or temporal advance in sending the packet in some upstream nodes, the local nodes can adjust the time at which the packet is sent through the deadline time adjustment value to reduce the latency jitter. Thereby, the service demands with stricter jitter requirements are met.

It shall be appreciated by a person having ordinary skills in the art that all or some of the operations and systems disclosed above can be implemented as software, firmware, hardware, and their appropriate combinations. Some or all physical components can be implemented as software executed by a processor, such as a central processing unit, a digital signal processor, or a microprocessor, or as hardware, or as an integrated circuit, such as an application-specific integrated circuit. Such software can be distributed on computer-readable media, which can include computer storage media (or non-transitory media) and communication media (or transitory media). As is well known to a person having ordinary skills in the art, the term computer storage medium includes volatile and nonvolatile, removable and non-removable medium implemented in any method or technology for storing information such as computer-readable instructions, data structures, program modules, or other data. Computer storage medium includes, but is not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be configured to store desired information and accessible by a computer. Furthermore, it is well known to those having ordinary skills in the art that communication media usually contains computer-readable instructions, data structures, program modules, or other data in modulated data signals such as carrier waves or other transmission mechanisms, and can include any information delivery media.

Described above is a description of several embodiments of the present disclosure, but the present disclosure is not limited to the above embodiments. Those having ordinary skills in the art can make various equivalent modifications or substitutions without departing the scope of the present disclosure, and these equivalent modifications or substitutions are within the scope defined by the claims of the present disclosure.

What is claimed is:

1. A method for packet scheduling, comprising:
acquiring a local deadline time indicative of a maximum allowable residence time of a packet at a local node;
acquiring a cumulative deadline time indicative of a sum of each local deadline time that the packet goes through at each upstream node via which the packet is transferred, and a cumulative residence time indicative of the sum of each local residence time that the packet goes through at each upstream node via which the packet is transferred;
acquiring a forwarding latency;
subtracting the cumulative residence time and the forwarding latency from the sum of the local deadline time and the cumulative deadline time to acquire a deadline time adjustment value; and
adjusting a time at which the packet is sent according to the deadline time adjustment value.

2. The method according to claim 1, wherein adjusting the time at which the packet is sent according to the deadline time adjustment value comprises:
determining a target forwarding queue from a plurality of forwarding queues according to the deadline time adjustment value, wherein each of the plurality of forwarding queues has a distinct time for packet transmission; and
buffering the packet in the target forwarding queue to adjust the time at which the packet is sent.

3. The method according to claim 2, wherein each of the plurality of forwarding queues has a distinct current countdown, and the moment at which the current countdown is 0, is the time at which the packet is sent; and
determining the target forwarding queue from the plurality of forwarding queues according to the deadline time adjustment value comprises:
determining the forwarding queue having a current countdown equal to the deadline time adjustment value as the target forwarding queue, from the plurality of forwarding queues.

4. The method according to claim 2, wherein each of the plurality of forwarding queues has an identical maximum countdown and a distinct current countdown, and the moment at which the current countdown is 0, is the time at which the packet is sent; and
determining the target forwarding queue from the plurality of forwarding queues according to the deadline time adjustment value comprises:
determining the forwarding queue having a current countdown equal to the maximum countdown as the target forwarding queue, from the plurality of forwarding queues, in response to the deadline time adjustment value being greater than the maximum countdown.

5. The method according to claim 2, wherein each of the plurality of forwarding queues has a distinct current countdown, and the moment at which the current countdown is 0, is the time at which the packet is sent; and
determining the target forwarding queue from the plurality of forwarding queues according to the deadline time adjustment value comprises:
determining a forwarding queue corresponding to the current countdown having a smallest non-zero value as the target forwarding queue from the plurality of forwarding queues, in response to the deadline time adjustment value being less than or equal to 0.

6. The method according to claim 1, further comprising:
acquiring a residence time during which the packet resides at the local node;
acquiring a new cumulative deadline time according to the local deadline time and the cumulative deadline time;
acquiring a new cumulative residence time according to the cumulative residence time and the residence time during which the packet resides at the local node; and
populating the packet with the new cumulative deadline time and the new cumulative residence time, or encapsulating the local deadline time, the new cumulative deadline time, and the new cumulative residence time into the packet.

7. The method according to claim 1, wherein the local node is an intermediate node of a transmission path along which the packet is transferred; and
acquiring the local deadline time comprises:
acquiring the local deadline time from the packet; or,
acquiring the local deadline time from a local routing table entry; or,
acquiring the local deadline time from a local policy table entry.

8. The method according to claim 1, wherein the local node is an intermediate node of a transmission path along which the packet is transferred; and
acquiring the cumulative deadline time and the cumulative residence time comprises:
acquiring the cumulative deadline time and the cumulative residence time from the packet.

9. A non-transitory computer-readable storage medium storing a computer-executable instruction which, when executed by a processor, causes the processor to carry out the method as claimed in claim 1.

10. A method for packet scheduling, comprising:
acquiring a local deadline time indicative of a maximum allowable residence time of a packet at a local node;
acquiring a cumulative latency error indicative of a difference between a sum of each local deadline time that the packet goes through at each upstream node via which the packet is transferred and the sum of each residence time that the packet goes through at each upstream node via which the packet is transferred;
acquiring a forwarding latency;
subtracting the forwarding latency from a sum of the local deadline time and the cumulative latency error to acquire a deadline time adjustment value; and
adjusting a time at which the packet is sent according to the deadline time adjustment value.

11. The method according to claim 10, further comprising:
acquiring a residence time during which the packet resides at a local node;
acquiring a new cumulative latency error according to the cumulative latency error, the local deadline time and the residence time during which the packet resides at the local node; and
populating the packet with the new cumulative latency error, or encapsulating the local deadline time and the new cumulative latency error into the packet.

12. The method according to claim 10, wherein the local node is an intermediate node of a transmission path along which the packet is transferred; and acquiring the cumulative latency error comprises:

acquiring the cumulative latency error from the packet.

13. A network device, comprising a memory, a processor and a computer program stored in the memory and executable by the processor which, when executed by the processor causes the processor to carry out method for packet scheduling, comprising:

acquiring a local deadline time indicative of a maximum allowable residence time of a packet at a local node;

acquiring a cumulative deadline time indicative of a sum of each local deadline time that the packet goes through at each upstream node via which the packet is transferred, and a cumulative residence time indicative of the sum of each local residence time that the packet goes through at each upstream node via which the packet is transferred;

acquiring a forwarding latency;

subtracting the cumulative residence time and the forwarding latency from the sum of the local deadline time and the cumulative deadline time to acquire a deadline time adjustment value; and adjusting a time at which the packet is sent according to the deadline time adjustment value.

14. The network device according to claim 13, wherein adjusting the time at which the packet is sent according to the deadline time adjustment value comprises:

determining a target forwarding queue from a plurality of forwarding queues according to the deadline time adjustment value, wherein each of the plurality of forwarding queues has a distinct time for packet transmission; and buffering the packet in the target forwarding queue to adjust the time at which the packet is sent.

15. The network device according to claim 14, wherein each of the plurality of forwarding queues has a distinct current countdown, and the moment at which the current countdown is 0, is the time at which the packet is sent; and determining the target forwarding queue from the plurality of forwarding queues according to the deadline time adjustment value comprises:

determining the forwarding queue having a current countdown equal to the deadline time adjustment value as the target forwarding queue, from the plurality of forwarding queues.

16. The network device according to claim 14, wherein each of the plurality of forwarding queues has an identical maximum countdown and a distinct current countdown, and the moment at which the current countdown is 0, is the time at which the packet is sent; and determining the target forwarding queue from the plurality of forwarding queues according to the deadline time adjustment value comprises:

determining the forwarding queue having a current countdown equal to the maximum countdown as the target forwarding queue, from the plurality of forwarding queues, in response to deadline time adjustment value being greater than the maximum countdown.

17. The network device according to claim 14, wherein each of the plurality of forwarding queues has a distinct current countdown, and the moment at which the current countdown is 0, is the time at which the packet is sent; and determining the target forwarding queue from the plurality of forwarding queues according to the deadline time adjustment value comprises:

determining a forwarding queue corresponding to the current countdown having a smallest non-zero value as the target forwarding queue from the plurality of forwarding queues, in response to the deadline time adjustment value being less than or equal to 0.

\* \* \* \* \*